(12) United States Patent
Ganz et al.

(10) Patent No.: US 10,322,962 B2
(45) Date of Patent: Jun. 18, 2019

(54) METHOD FOR PRODUCING A SUBSTRATE TUBE OF QUARTZ GLASS

(71) Applicant: Heraeus Quarzglas GmbH & Co. KG, Hanau (DE)

(72) Inventors: Oliver Ganz, Bruchkoebel (DE); Harald Hain, Kahl (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 101 days.

(21) Appl. No.: 15/197,245

(22) Filed: Jun. 29, 2016

(65) Prior Publication Data

US 2017/0001901 A1 Jan. 5, 2017

(30) Foreign Application Priority Data

Jul. 3, 2015 (EP) .................................. 15175343

(51) Int. Cl.
*C03B 37/012* (2006.01)
*C03B 23/047* (2006.01)

(52) U.S. Cl.
CPC ...... *C03B 37/01242* (2013.01); *C03B 23/047* (2013.01); *C03B 37/01245* (2013.01); *C03B 2205/40* (2013.01)

(58) Field of Classification Search
CPC ........ C03B 37/01242; C03B 37/01245; C03B 23/047; C03B 2205/40
See application file for complete search history.

(56) References Cited

U.S. PATENT DOCUMENTS 5,785,729 A 7/1998 Yokokawa et al.
6,516,636 B1 * 2/2003 Gansicke ............. C03B 23/047
65/379

(Continued)

FOREIGN PATENT DOCUMENTS

JP 2007320803 A 12/2007
WO 2004083141 A1 9/2004
WO 2005009913 A1 2/2005

OTHER PUBLICATIONS

Search Report dated Jan. 20, 2016 in EP Application No. 15175343.

*Primary Examiner* — Queenie S Dehghan
(74) *Attorney, Agent, or Firm* — Panitch Schwarze Belisario & Nadel LLP

(57) ABSTRACT

A method for producing substrate tubes of quartz glass includes continuously supplying a hollow cylinder of quartz glass to a heating zone, softening the hollow cylinder zonewise in the heating zone, and drawing off a tubular strand from the softened portion. The hollow cylinder has an outer diameter $C_a$, an inner diameter $C_i$ and an inner bore. The tubular strand has an outer diameter $T_a$ and an inner diameter $T_i$. The following parameters are applicable to the hollow cylinder and the tubular strand: $C_a > 180$ mm, $C_r > 3$ with $C_r = C_a/C_i$, $T_r < 1.6$ with $T_r = T_a/T_i$ and $C_i/T_i < 2.5$. The blow pressure in an inner bore is adjusted to a value in the range of 4 to 10 mbar. Substrate tubes, obtained by cutting the tubular strand to the desired length, serve as semi-finished products for the manufacture of preforms for optical fibers.

13 Claims, 2 Drawing Sheets

(56) References Cited

U.S. PATENT DOCUMENTS

| | | | |
|---|---|---|---|
| 7,891,213 B2* | 2/2011 | Bogdahn | ............... C03B 23/047 65/378 |
| 8,061,162 B2* | 11/2011 | Bogdahn | ............. C03B 37/0124 65/108 |
| 8,544,299 B2* | 10/2013 | Schoetz | ............ C03B 37/01211 428/542.8 |
| 2008/0041112 A1 | 2/2008 | Cibis et al. | |
| 2012/0011889 A1 | 1/2012 | Bogdahn et al. | |
| 2014/0245796 A1 | 9/2014 | Bernard et al. | |

* cited by examiner

Table of Test Parameters and Measurement Results

| Sample | $C_a$ [mm] | $C_i$ [mm] | $T_a$ [mm] | $T_i$ [mm] | $C_R$ | $T_R$ | Inner diameter ratio $C_i/T_i$ | Inner surface ratio $A(T)/A(C)$ | Draw ratio $L(T)/L(C)$ | Blow pressure [mbar] | Roughness $R_z$ [µm] | Bending [mm/m] |
|---|---|---|---|---|---|---|---|---|---|---|---|---|
| Reference: WO2004/083141 A1 | 150 | 70 | 28 | 22 | 2.1 | 1.3 | 3.2 | 18.4 | 59 | 3 | 0.22 | 1.1 |
| 1 | 180 | 55 | 30 | 26 | 3.3 | 1.2 | 2.1 | 62.0 | 131 | 7 | 0.10 | 0.2 |
| 2 comparison | 180 | 70 | 30 | 26 | 2.6 | 1.2 | 2.7 | 45.6 | 123 | 6 | 0.11 | 0.8 |
| 3 | 200 | 55 | 39 | 34 | 3.6 | 1.1 | 1.6 | 62.6 | 101 | 8 | 0.12 | 0.4 |
| 4 comparison | 200 | 70 | 39 | 34 | 2.9 | 1.1 | 2.1 | 46.7 | 96 | 7 | 0.16 | 0.4 |
| 5 | 220 | 60 | 40 | 34 | 3.7 | 1.2 | 1.8 | 57.2 | 101 | 8 | 0.13 | 0.5 |
| 6 comparison | 220 | 80 | 40 | 34 | 2.8 | 1.2 | 2.4 | 40.2 | 95 | 7 | 0.18 | 0.6 |
| 7 | 240 | 42 | 25 | 17 | 5.7 | 1.5 | 2.47 | 67.3 | 166 | 8 | 0.15 | 0.7 |
| 8 comparison | 240 | 80 | 25 | 17 | 3.0 | 1.5 | 4.7 | 32.4 | 152 | 7 | 0.14 | 1.2 |
| 9 | 200 | 50 | 90 | 47 | 4.0 | 1.9 | 1.1 | 6.0 | 6 | 5 | 0.25 | 0.3 |
| 10 | 290 | 50 | 33 | 21 | 5.8 | 1.57 | 2.4 | 52.9 | 126 | 8 | 0.09 | 0.7 |

METHOD FOR PRODUCING A SUBSTRATE TUBE OF QUARTZ GLASS

BACKGROUND OF THE INVENTION

The present invention relates to a method for producing a substrate tube of quartz glass, comprising continuously supplying to a heating zone a hollow cylinder of quartz glass having an outer diameter $C_a$, an inner diameter $C_i$ and an inner bore, zone-wise softening the hollow cylinder in the heating zone, and drawing off from the softened portion a tubular strand with an outer diameter $T_a$ and an inner diameter $T_i$.

Substrate tubes of the desired length are obtained by cutting the tubular strand to length. They serve as semi-finished product in the manufacture of preforms for optical fibers. Additional glass layers are here deposited from the gas phase on the inner wall of the substrate tube.

A generic vertical drawing method for producing a substrate tube is known from WO 2004/083141 A. A hollow cylinder of synthetic quartz glass is supplied from above in a vertical orientation of the longitudinal axis of the cylinder to a furnace having an annular heating element of graphite. The hollow cylinder has an outer diameter $C_a$ of 150 mm and an inner diameter $C_i$ of 70 mm. The diameter ratio $C_r=C_a/C_i$ is thus about 2.14. After the furnace has been heated to its target temperature of about 2,300° C., the hollow cylinder is continuously moved into the furnace at a lowering rate of 11 mm/min and thereby softened zone by zone. At the same time a tubular strand with an inner diameter $T_i$ of 22 mm and an outer diameter $T_a$ of 28 mm is drawn off by means of a draw-off device at a rate of 640 mm/min. The diameter ratio in the tubular strand $T_r=T_a/T_i$ is thus about 1.27.

During the drawing process, the outer diameter and the wall thickness of the drawn-off tubular strand are kept constant by way of a process control. The internal pressure within the inner bore of the hollow cylinder serves as a control variable. The pressure is produced and maintained by introducing a nitrogen stream into the inner bore of the hollow cylinder. The nitrogen used is first dried to prevent the incorporation of hydroxyl groups (OH groups) into the quartz glass of the inner wall. The nitrogen flow rate (about 30 L/min) is configured such that a blow pressure of about 1.5 mbar is obtained. The lower end of the drawn-off tubular strand is closed, in part, by means of a plug to avoid an unhindered outflow of the stream of nitrogen and a resulting cooling of the inner wall of the drawn-off quartz glass tube by the gas flow. A smooth inner wall is obtained that is distinguished by a mean surface roughness $R_a$ of 0.06 μm.

The glass tube produced thereby is cut to suitable segments and is used as a substrate tube for the deposition of $SiO_2$ layers on the inner wall by means of an MCVD method.

The inner wall of the substrate tube forms a contact surface with another, subsequently added glass which either belongs to the core of the optical fiber or is adjacent to the fiber core. Therefore, the inner wall of the substrate tube must, in principle, be free of flaws and impurities.

The drying of the nitrogen stream as suggested in WO 2004/083141 A1 represents an effective measure for limiting the incorporation of hydroxyl groups into the quartz glass of the inner wall, but makes the substrate tube production, which is already cost-intensive, even more expensive.

It has also been suggested that the inner wall of the substrate tube should be removed in the end, for instance by mechanical milling or by etching, to eliminate impurities contained on or in the surface layer. These procedures are, however, complicated and slow, and they form additional sources for impurities and surface defects.

The known elongation methods for producing substrate tubes are typically vertical drawing methods without any tools. A molding tool is not used in the formation of the outer wall or in the formation of the inner wall. The reason is that vapors and particles released from a molding tool or drawing streaks formed by mechanical contact could otherwise ruin the outer cylinder surfaces of the substrate tube.

However, the shaping of the initial hollow cylinder without tools entails problems regarding compliance with the nominal radial dimensions of the tube strand and the rotation symmetry. Specifically, high-frequency diameter variations as well as ovality in the radial cross-sectional profile or wall one-sidedness are noticed, i.e. radially irregular profiles of the tube wall thickness, which is also called "siding" among the experts. These problems are the more pronounced, the stronger the shaping process from the hollow cylinder into the tube. A measure thereof is the so-called "elongation ratio" or "draw ratio". This measure designates the ratio of the lengths of drawn-off tubular strand and start cylinder.

To improve the dimensional stability in elongation processes having a high draw ratio, many measures have been suggested, e.g., rotating the start cylinder about its longitudinal cylinder axis, the use of short or long heating zones or optimizing the gap width between the heating zone and the hollow cylinder. However, a reproducible transfer of these measures to the production of substrate tubes by way of elongation without the use of tools turns out to be difficult.

It is therefore an objective of the present invention to provide an elongation process for the cost-effective production of substrate tubes of high dimensional stability and surface quality.

BRIEF SUMMARY OF THE INVENTION

The method of the above-mentioned type according to the present invention involves producing a blow pressure in the inner bore that is set in the range of 4 to 10 mbar. The following is applicable to hollow cylinder and tubular strand:

$Ca>180$ mm, $Cr>3$ with $Cr=Ca/Ci$, $Tr<1.6$ with $Tr=Ta/Ti$ and $Ci/Ti<2.5$.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 2 shows a table with test parameters and measurement results.

DETAILED DESCRIPTION OF THE INVENTION

Figure 1:
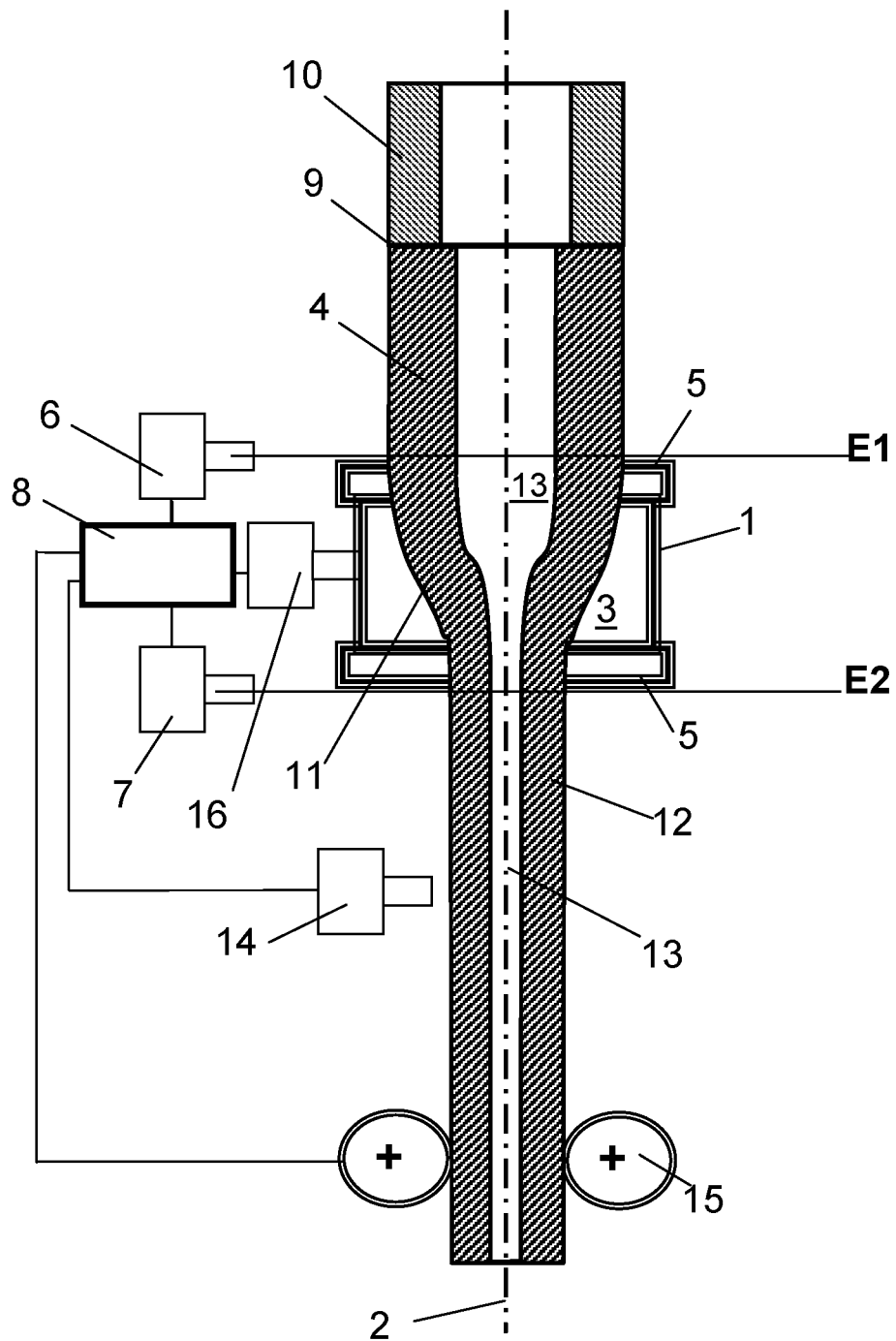
FIG. 1 shows a schematic view of an apparatus for performing the method according to the present invention.

A few terms shall first be explained in the following and then, in detail, the effect of the measures of the method according to the present invention.

"Blow pressure" designates the overpressure prevailing in the inner bore of the hollow cylinder as compared to the pressure prevailing outside thereof. The pressure prevailing outside of the inner bore is atmospheric pressure in the simplest case. The blow pressure is produced and maintained by introducing a pressure gas, such as, e.g., nitrogen, into the inner bore of the hollow cylinder. The blow pressure level has an impact on the wall thickness of the drawn-off tubular strand.

"Drawing bulb" is the transition region formed in the elongation process between the hollow cylinder and the drawn-off tubular strand from the hollow-cylinder glass mass softened in the heating zone. Within the drawing bulb, the inner bore of the hollow cylinder is not completely collapsed, so that it further comprises a continuous channel between the inner bores of the hollow cylinder and tubular strand.

"Start cylinder" designates the hollow cylinder of quartz glass which is subjected to the elongation process. The "inner surface" is the free surface of the inner walls of the hollow cylinder and drawn-off tube, including the drawing bulb, the inner walls defining the inner bore.

In the elongation process, the inner bore of the start cylinder is subjected to a considerable change in form, which is here also called "shaping process". The inner bore gets narrower and longer. This has different impacts on the size of the inner surface. The constriction of the inner bore leads to a decrease, and the elongation leads to an increase in the inner surface. In the method according to the present invention, a new inner-wall surface is always formed in the end. In addition to the draw ratio, the degree of new formation of inner surface, expressed as the ratio of the nominal inner surfaces of the hollow cylinder and tubular strand, is a further measure of the intensity/degree of the shaping process.

It has been found that the quality of the inner wall of the drawn-off tubular strand depends on the intensity of the shaping process. An intensive shaping process tends to produce a better and smoother inner surface. On the other hand, at a high shaping degree in the elongation process without tools, there is the risk that dimensional stability and rotation symmetry deteriorate in the drawn-off tubular strand. It has been found that, especially in combination with high temperatures of the glass mass, the tubular strand tends to bend along the longitudinal axis.

Starting from typical outer diameters of the substrate tube in the range of about 30 to 40 mm, it has therefore been tried to provide a start cylinder the radial dimensions of which are such that they fulfill both boundary conditions in the elongation process as much as possible, i.e., a high dimensional stability and a high quality of the inner surface of the drawn-off tubular strand are obtained at the same time. It has been found that the blow pressure plays an important role here. With an additional adaptation of the blow pressure, this has yielded the following technical teaching:

To achieve a high shaping degree, a thick-walled hollow cylinder with an outer diameter $C_a$ of at least 180 mm is used as the start cylinder. The great wall thickness of the hollow cylinder manifests itself in that the diameter ratio $C_r$ of outer diameter ($C_a$)/inner diameter ($C_i$) is greater than 3 ($C_r>3$).

A comparatively thin-walled tubular strand and thus a thin-walled substrate tube are obtained from the thick-walled start cylinder in the shaping process. The small wall thickness of the tubular strand manifests itself in that the diameter ratio $T_r$ of outer diameter ($T_a$)/inner diameter ($T_i$) is less than 1.6 ($T_r<1.6$).

This shaping process requires a great elongation ratio and creates a new surface, accompanied by a smooth inner wall in the drawn-off tubular strand.

The new formation on the inner surface is primarily due to the stretching of the start cylinder in the direction of its longitudinal axis. However, in order to avoid as much as possible considerable radial deformations for the collapsing of the inner bore of the hollow cylinder, which deformations may easily lead to deflections, distortions and surface defects, it is intended that the diameter of the inner bores of the hollow cylinder and tubular strand differ from each other by not more than the factor 2.5 ($C_i/T_i<2.5$). This measure ensures dimensional stability and rotation symmetry of the drawn-off tubular strand.

The blow pressure is set in the range between 4 and 10 mbar. This is a comparatively high pressure. This leads to a rapid shaping of the start cylinder in the area of the drawing bulb, which reduces the process duration while the newly created inner surface is exposed to the high shaping temperatures and the pressure gas. The introduction of impurities into the glass is thereby minimized, so that the use of specially treated and expensive gases for the production of the blow pressure can be omitted. This has a positive noticeable effect on the surface quality, particularly in the shaping of thick-walled hollow cylinders, which shaping as such is lengthy.

The elongation process of the present invention using a thick-walled start cylinder thereby allows for cost-effective manufacturing of substrate tubes with high dimensional stability and surface quality by paying attention to the boundary conditions with respect to $C_r$ and $T_r$, the inner diameter ratio $C_i/T_i$ and the blow pressure.

The more thick-walled the start cylinder and the greater the difference between the inner diameters of hollow cylinder and annular gap, the more intensive is the shaping process, the longer are the dwell times of the hot quartz glass in the drawing bulb, and thus the greater is the risk that impurities are introduced into the softened quartz glass.

Therefore, it is intended in a preferred procedure that the blow pressure is set in the range of 6 to 8 mbar, and that the following is applicable to the hollow cylinder:

$C_a<300$ mm, and $C_i/T_i<2$.

Substrate tubes are generally distinguished by a comparatively small wall thickness and a large inner diameter of at least 20 mm. The method according to the present invention is particularly adapted to the manufacture of substrate tubes, where the following is applicable to the tubular strand:

$28<T_a<50$, and $T_r<1.3$.

To achieve a high shaping rate, a thick-walled hollow cylinder is used in which the diameter ratio outer diameter/inner diameter is great by comparison with the substrate tube to be produced therefrom. In this respect, it has turned out to be useful when the following is applicable to hollow cylinder and tubular strand:

$3.5 < C_r < 4.5$, and $Cr > T_r + 2.4$.

By way of mechanical treatment (particularly drilling, honing and grinding), a quartz-glass blank can be processed into a straight cylinder with an exactly circular cross-section and small dimensional deviations. Therefore, to ensure an elongation process with a defined and reproducible initial state, the outer cylinder surfaces of the hollow cylinder are normally given their final dimension by way of mechanical treatment. The surface cracks and structures produced thereby can be successively reduced by grinding, honing and polishing steps, which is normally followed by a final etching treatment. The treatment efforts define the achievable surface quality, which is often characterized by the surface roughness of the treated outer cylinder surface.

It has been found that on account of the high shaping degree in the method according to the present invention, the drawn-off tubular strand is also provided with a sufficiently smooth inner surface if the treatment efforts for smoothing the inner wall of the hollow cylinder are comparatively small. Therefore, it is intended in a particularly preferred procedure that the hollow cylinder has an inner bore with an inner wall that has a surface roughness defined by a roughness value $R_z > 1$ µm.

The roughness parameter Rz according to DIN EN ISO 4287 is called "averaged roughness depth". $R_z$ is the sum obtained from the height of the highest profile tip and the depth of the deepest profile valley within an individual measurement section. Rz is normally obtained by averaging the results of five individual measurement sections. An "averaged roughness depth" $R_z$ of 1 µm or more is thus achievable by way of surface treatment using grinding and honing. The polishing step is here omitted. The optional etching treatment following this mechanical treatment normally leads to a further increase of $R_z$. The condition Rz>1 therefore refers to the state of the inner surface of the hollow cylinder prior to the elongation process, irrespective of whether this state has been achieved solely by mechanical treatment or by mechanical treatment and etching treatment.

The method according to the present invention accepts a comparatively low surface quality of the inner wall of the hollow cylinder, thereby permitting the use of hollow cylinders which, due to a less complicated mechanical treatment of their inner wall, can be produced at comparatively low costs.

The requirements regarding the quality of the outer surface of the hollow cylinder are even somewhat lower. The hollow cylinder is preferably provided with an outer wall which has a surface roughness defined by a roughness value $R_z > 4$ µm. Likewise, the provision Rz>4 µm for the state of the outer surface prior to the elongation process is independent of the question of whether the outer wall has been given this state solely by way of mechanical treatment or by mechanical treatment and etching treatment.

In the method according to the present invention, the quality of the inner wall of the tubular strand is primarily determined by the above-explained blow-pressure and geometry parameters that define the degree and the shaping rate of the shaping process. Specifically with respect to the shaping rate, the form and size of the heating zone plays a certain role. In this context, it has turned out to be advantageous when a heating zone is used that comprises a circular inner space which is bounded by an inner wall and which defines a heating space volume $V_{Heiz}$ within which the hollow cylinder, drawing bulb and tubular strand occupy a cylinder space volume $V_c$, where $V_{Heiz} > 2.5 \times V_c$.

The heating space volume $V_{Heiz}$ is defined by the inner space of the heating element of relevance to the maximum temperature. In a heating device having plural superposed heating elements, the heating element with the highest temperature is the one that defines the heating space volume $V_{Heiz}$. The cylinder space volume $V_c$ is obtained as the sum of the space volume fractions of the hollow cylinder, drawing bulb and possibly tubular strand that are positioned within the heating space volume, without regard to the volume of the inner bore. The cylinder space volume $V_c$ thereby corresponds to the volume that defines the outer envelope around the mass of the hollow cylinder/drawing bulb/tubular strand within the heating zone. Since the cylinder space volume is smaller by at least the factor of 2.5 than the heating space volume, this leads to a comparatively diffuse imaging of the temperature distribution at the heating element on the drawing bulb. It has been found that even at a high shaping degree, the compliance with a high dimensional stability of the tubular strand is facilitated.

It this context, it has also turned out to be advantageous when an annular gap with a mean gap width in the range of 15 mm and 25 mm remains between the inner wall of the heating zone and the hollow cylinder.

The narrower the gap between the inner wall of the heating zone and the hollow cylinder, the more accurately is the temperature distribution of a heating element imaged on the hollow cylinder. At gap widths of less than 15 mm, one obtains a comparatively small drawing bulb with a comparatively small drawing bulb volume. Due to the relatively great changes in volume in the method according to the present invention, a greater drawing bulb volume is however desired, as is obtained as a result of the gap widths in the range of 15 mm and 25 mm, especially when the heating zone has a length L between 150 and 200 mm.

Shaping degree and shaping rate manifest themselves in connection with the geometry data of the start cylinder and of the tubular strand also in the throughput. A high throughput volume is accompanied by a high shaping degree. In this context, a procedure is preferred in which the throughput volume assumes a value in the range of 15 to 25 kg/h when the outer diameter Ta of the tubular strand is set to a value in the range of 28 mm to not more than 35 mm.

As an alternative, at an outer diameter Ta of the tubular strand in the range of 35 to 50 mm, the throughput volume is preferably set to a value in the range of 20 to 30 kg/h In the method according to the present invention, the shaping degree is considerably determined by the increase in inner surface from the hollow cylinder to the tube. Here, the elongation ratio plays an important role. The tubular strand is preferably drawn off at an elongation ratio of less than 150, particularly preferably in the range of 50 and 130.

The apparatus according to FIG. 1 facilitates the elongation of a hollow cylinder 4 without the use of tools. It comprises a resistance type heating furnace which consists essentially of a vertically oriented heating tube 1 of graphite that encloses a heating space 3 which is circular in horizontal cross-section. The heating tube 1 consists of an annular element with an inner diameter of 240 mm, an outer diameter of 260 mm, and a length of 180 mm. The heating tube 1 consists of graphite with a low content of ash. The heating tube 1 of graphite encloses the heating zone proper. The heating tube 1 is extended at both sides by means of extension pieces 5 which consist of graphite tubes and which have a width of 55 mm, an inner diameter of 250 mm and an outer diameter of 280 mm. Due to their rather large wall thickness and their rather great distance from the outer surface of the hollow cylinder, the temperature acting on the hollow cylinder 4 in the area of the extension pieces 5 is more than 50° C. lower than the maximum temperature in the area of the heating zone. The inner volume of the heating zone $V_c$ is thus about 8140 mm³.

At the level of an upper detection plane E1 (at the upper edge of the upper extension piece 5), a pyrometer 6 is arranged that detects the surface temperature of the hollow cylinder 1. At the level of a lower detection plane E2 (at the lower edge of the lower extension piece 5), a further pyrometer 7 is arranged that detects the surface temperature of the elongated tubular strand 12. The temperature measurement values of the pyrometer 6 and 7 and the temperature of the heating tube 1 measured by a pyrometer 16 are each fed to a computer 8.

The upper end of the hollow cylinder 4 is connected through a weld 9 to a quartz-glass holding tube 10 by means of which it is movable in the horizontal and vertical directions.

The hollow cylinder 4 is oriented such that its longitudinal axis extends as coaxially as possible relative to the central axis 2 of the heating tube 1. The hollow cylinder 4 is supplied to the heating space 3 (starting with its lower end) at a constant feed rate from above and is softened therein. A tubular strand 12 is drawn off vertically downwards from the softened region so as to form a drawing bulb 11. The tubular strand 12 is here guided along a wall-thickness measuring device 14 which is also connected to the computer 8, so that the wall thickness of the drawn-off tubular strand 12 can be recorded in the drawing process and evaluated with the help of the computer 8. The continuous inner bore of the hollow cylinder 4 and the tubular strand 12 bears the reference numeral 13. The tube draw-off rate is detected by means of a draw-off device and adjusted by way of the computer 8.

An embodiment for carrying out the vertical drawing method of the present invention for producing a quartz glass tube shall now be explained in more detail with reference to the apparatus of FIG. 1.

Production of Hollow Cylinders

With the help of a standard OVD (outside vapor deposition) method, $SiO_2$ soot particles are deposited layer by layer by reciprocating a deposition burner on a carrier rotating about its longitudinal axis. After completion of the deposition process and removal of the carrier, one obtains a porous tube of $SiO_2$ soot which is subjected to a dehydration treatment for removing hydroxyl groups introduced by the manufacturing process. The soot tube is here introduced in a vertical orientation into a dehydration furnace and initially treated at a temperature in the range of 850° C. to about 1000° C. in a chlorine-containing atmosphere. After a treatment period of six hours, one obtains a hydroxyl group concentration of less than 100 wt. ppm in the soot material.

The soot tube treated in this way is vitrified in a vitrification furnace at a temperature in the range of about 1350° C. without the inner bore collapsing. The two end portions of the tubular quartz-glass blank of synthetic quartz glass produced in this way are cut off and the outer wall is coarsely ground by way of a peripheral grinder which is equipped with a #80 grindstone, whereby the predetermined outer target diameter is mainly obtained. The outer surface of the tube is then finely ground by means of an NC peripheral grinder. The inner bore of the tube obtained thereby is honed on the whole by means of a honing machine which is equipped with a #80 honing stone, with the degree of smoothing being continuously refined, and the final treatment is carried out with a #800 honing stone. Subsequently, the hollow cylinder is briefly etched in a 30% hydrofluoric-acid etching solution. The mean surface roughness $R_z$ is then 5.5 μm in the area of the inner wall and 100 μm in the area of the outer wall.

Hollow cylinders with different radial dimensions were thereby made from synthetic quartz glass. The dimensions are listed in the Table of FIG. 2.

Production of Substrate Tubes

The hollow cylinders were used for producing substrate tubes with the help of an elongation process, which shall be explained hereinafter with reference to an example.

In the vertically oriented heating tube 1, a quartz-glass hollow cylinder 4 with an outer diameter of 200 mm and an inner diameter of 50 mm is adjusted such that its longitudinal axis extends coaxially to the central axis 2 of the heating tube 1. The hollow cylinder 4 of quartz glass which is positioned in the central axis 2 of the heating tube 1 is subsequently released at a given feed rate into the heating tube 1 in such a manner that a mass throughput of 20 kg/h is obtained. In the heating zone, the hollow cylinder 4 is heated to a temperature above 2,200° C. The tubular strand 12 of quartz glass is drawn off from the evolving drawing bulb 11 at a controlled draw rate to a nominal outer diameter of 40 mm and an inner diameter of 36 mm (wall thickness: 2 mm). The hollow cylinder 4, drawing bulb 11 and tubular strand 12 occupy a total cylinder space volume of about 2700 mm³ within the heating zone 3 with the heating space volume $V_{Heiz}$ (about 8,100 mm³).

During the drawing process, a nitrogen stream is introduced into the inner bore 13 via a purging gas line (not shown). The nitrogen stream is dimensioned such that a blow pressure of 7 mbar is set in the inner bore 13. The blow pressure is continuously measured and the flow rate of the nitrogen stream is readjusted accordingly. By using a plug which partly closes the lower end of the tubular strand 12, the unhindered outflow of the nitrogen stream can be impeded and the flow rate can be limited to about 30 L/min. As a result, an excessive cooling of the inner wall of the tubular strand 12 by the gas flow is avoided and a smooth fused surface is obtained that is distinguished by an averaged roughness value $R_z$=0.10 μm (FIG. 2: Sample 1).

With the help of the process control, the outer diameter and the wall thickness of the drawn-off tubular strand 12 are controlled. The blow pressure within the inner bore 13 serves as a control variable for the wall thickness, the blow pressure mainly deriving from the nitrogen stream, so that upon dimensional changes the amount of the nitrogen stream is regulated by means of a control unit.

Further drawing tests with the parameters mentioned in the Table of FIG. 2 were carried out by analogy with the procedures explained above with reference to Sample 1, particularly with the parameters indicated there for the mechanical treatment of the hollow cylinder before the elongation process. In contrast to the mass throughput in Sample 1 of 20 kg/k, the mass throughput was set to 40 kg/h in the samples having a nominal outer diameter of the tubular strand of more than 35 mm; in Sample 9, it was even set to 50 kg/h.

Measurement of the Tube Bending

Sections of the desired substrate tube length are cut off from each tubular strand 12. The ends of the tube piece are clamped in a lathe with a defined rotation axis. The tube piece rotating about the rotation axis is illuminated in a direction perpendicular to the rotation axis by means of a laser beam expanded beyond the tube diameter. The shading of the laser beam yields, for each circumferential position, the outer diameter of the tube and the position of the tube center point (as half the outer diameter) at the respective axial measurement point (M). The maximum offset value (Max(Bow)$_M$) between the rotation axis and the tube center point at the axial measurement point is stored. The axial measurement point is shifted in 75 mm steps along the longitudinal axis of the tube piece until the total tube piece is measured. The greatest offset (Bow$_{max}$) is determined from the maximum offset values (Max(Bow)$_M$) of all measurement points. The one meter-standardized calculation of the deflection of the tube piece in consideration of the tube piece length (L) is then carried out on the basis of the following equation: bending [mm/mm]=Bow$_{max}$ [mm]/L [m].

The tube pieces obtained from a hollow cylinder 4 form a respective batch. The bending value indicated in the last column of the Table of FIG. 2 represents the median of the batch in question, i.e. the value that is the middle one in the list classified according to size.

Measurement of the Roughness Parameter R$_z$

The roughness parameter R$_z$ is determined as a height difference of the highest profile tip and the deepest profile valley within an individual measurement section according to DIN EN ISO 4287. R$_z$ is the arithmetic mean of five individual measurement sections.

Measurement Results

The tubular strand segments are used as a substrate tube for the deposition of SiO$_2$ layers on the inner wall by means of an MCVD method or on the basis of another plasma type inside deposition method. Despite comparatively inexpensive manufacturing parameters, the substrate tube is distinguished, especially because of the use of thick-walled start cylinders of quartz glass and a less complicated mechanical finishing of inner wall and outer wall of the hollow cylinder, by a sufficiently smooth inner surface and by high dimensional stability, particularly due to small deflection. A bending of not more than 0.7 mm/m and a roughness of the inner surface with an Rz value of not more than 0.15 µm are considered to be acceptable.

Details on process parameters and results can be found in the Table of FIG. 2, where C$_a$ outer diameter of the hollow cylinder
C$_i$ inner diameter of the hollow cylinder
T$_A$ nominal outer diameter of the tubular strand
T$_I$ nominal inner diameter of the tubular strand
C$_R$ diameter ratio C$_a$/C$_i$
T$_R$ diameter ratio T$_a$/T$_i$
A(C)=inner surface of the hollow cylinder
A(T)=inner surface of the tube
L(C)=length of the hollow cylinder
L(T)=length of the tubular strand A reference sample was produced on the basis of the geometry and draw parameters, as can be seen in WO 2004/083141 A1 (line 1 of the Table of FIG. 2). Samples 2, 4, 6, 8 and 9 represent further comparative samples. As can be seen, a small diameter ratio in the start cylinder (C$_r$<3) is usually accompanied by a small shaping degree, represented by the ratio of the inner surfaces A(T)A(C), i.e., even if the draw ratio (L(T)/L(C)) is relatively great. In the finishing treatment of the hollow cylinder given as a reference, this will however lead to an unacceptable roughness of the inner surface in the drawn-off tubular strand, as shown in Comparative Samples 4, 6 and 9. By contrast, although Samples 2 and 8 show acceptable roughness, they exhibit increased deflection, which can be ascribed to the great difference of the inner diameter of hollow cylinder and tubular strand, i.e. to the ratio C$_i$/T$_i$ and the accompanying shaping degree in radial direction.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for producing a substrate tube of quartz glass, comprising:
   continuously supplying a hollow cylinder of quartz glass to a heating zone (3), the hollow cylinder having an outer diameter C$_a$, an inner diameter C$_i$, an inner bore and a wall thickness of at least 62.5 mm;
   zonewise softening the hollow cylinder in the heating zone (3); and
   drawing off a tubular strand (12) from a softened portion of the hollow cylinder, the tubular strand (12) having an outer diameter T$_a$ and an inner diameter T$_i$,
   wherein a blow pressure is produced in an inner bore (13) is in the range of 4 to 10 mbar, and
   wherein the following parameters are applicable to the hollow cylinder (4) and the tubular strand (12):

$C_a$>180 mm, $C_r$>3 with $C_r=C_a/C_i$, $T_r$<1.6 with $T_r=T_a/T_i$, $C_i/T_i$<2.5, and $C_r/T_r$>1.88.

2. The method according to claim 1, wherein the blow pressure is in the range of 6 to 8 mbar, and wherein the following parameters are applicable to the hollow cylinder:

$Ca$<300 mm, and $C_i/T_i$<2.

3. The method according to claim 1, wherein the following parameters are applicable to the tubular strand:

28 mm<$Ta$<50 mm, and $T_r$<1.3.

4. The method according to claim 1, wherein the following parameters are applicable to the hollow cylinder and the tubular strand:

3.5<$Cr$<4.5, and $C_r$>$T_r$+2.4.

5. The method according to claim 1, wherein the inner bore of the hollow cylinder has an inner wall that has a surface roughness defined by a roughness value R$_z$>1 µm.

6. The method according to claim 1, wherein the hollow cylinder has an outer wall that has a surface roughness defined by a roughness value R$_z$>4 µm.

7. The method according to claim 1, wherein a heating tube (1) is used that comprises a circular heating space (3) which is bounded by an inner wall and which defines a heating space volume V$_{Heiz}$ within which the hollow cylinder (4), a drawing bulb (11) and the tubular strand (12) occupy a cylinder space volume V$_c$, where V$_{Heiz}$>2.5×V$_c$.

8. The method according to claim 7, wherein an annular gap with a mean gap width in the range of 15 mm and 25 mm remains between the inner wall of the heating zone and the hollow cylinder (4).

9. The method according to claim 7, wherein the heating tube (1) has a length L between 150 mm and 200 mm.

10. The method according to claim 1, wherein the outer diameter $T_a$ of the tubular strand is in the range of 28 mm to not more than 35 mm and a throughput volume is in the range of 10 to 20 kg/h.

11. The method according to claim 1, wherein the outer diameter $T_a$ of the tubular strand is in the range of 35 mm to 50 mm and a throughput volume is in the range of 20 to 30 kg/h.

12. The method according to claim 1, wherein the tubular strand is drawn off at an elongation ratio of less than 150.

13. The method according to claim 1, wherein the tubular strand is drawn off at an elongation ratio in the range between 50 and 130.

* * * * *